E. M. LEWIS.
PROCESS OF MANUFACTURING BICYCLE FRAMES.
APPLICATION FILED SEPT. 2, 1919.

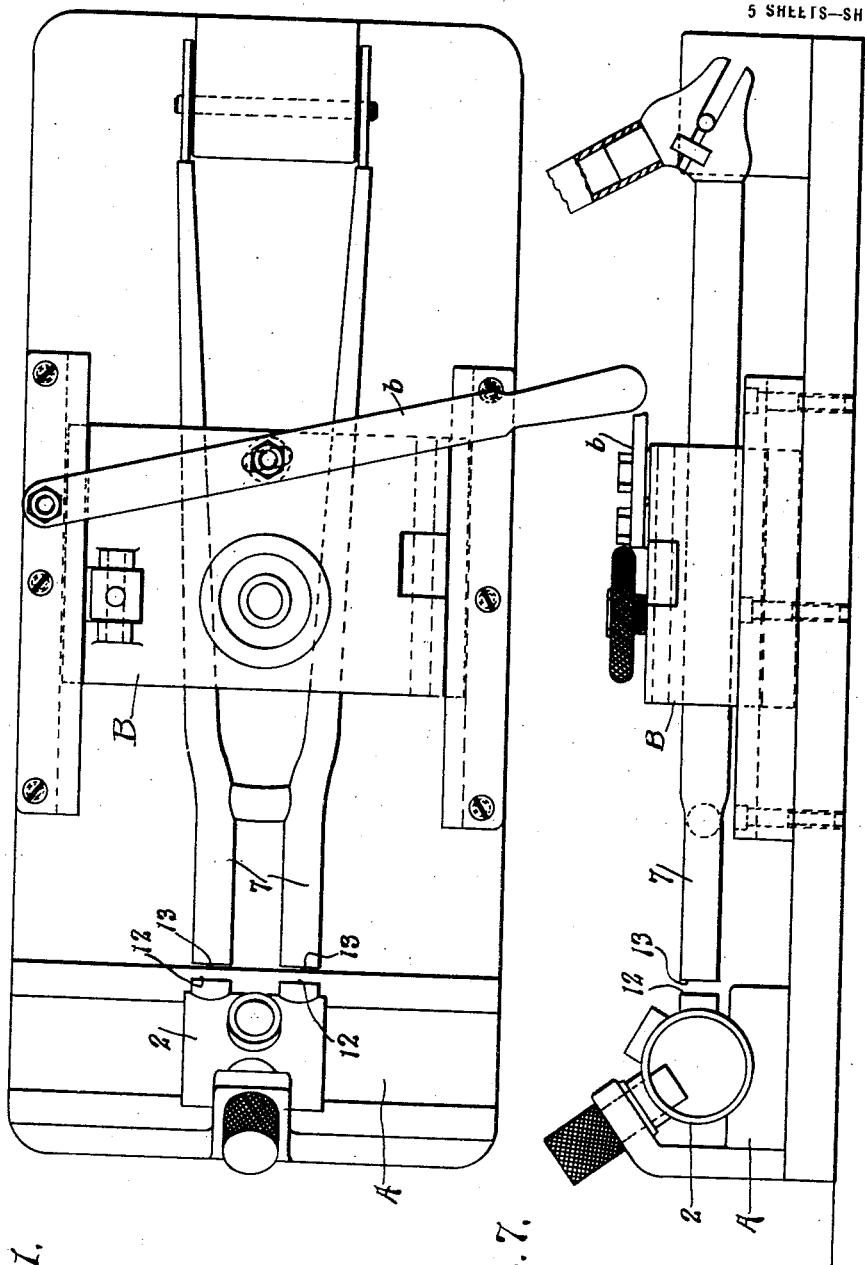

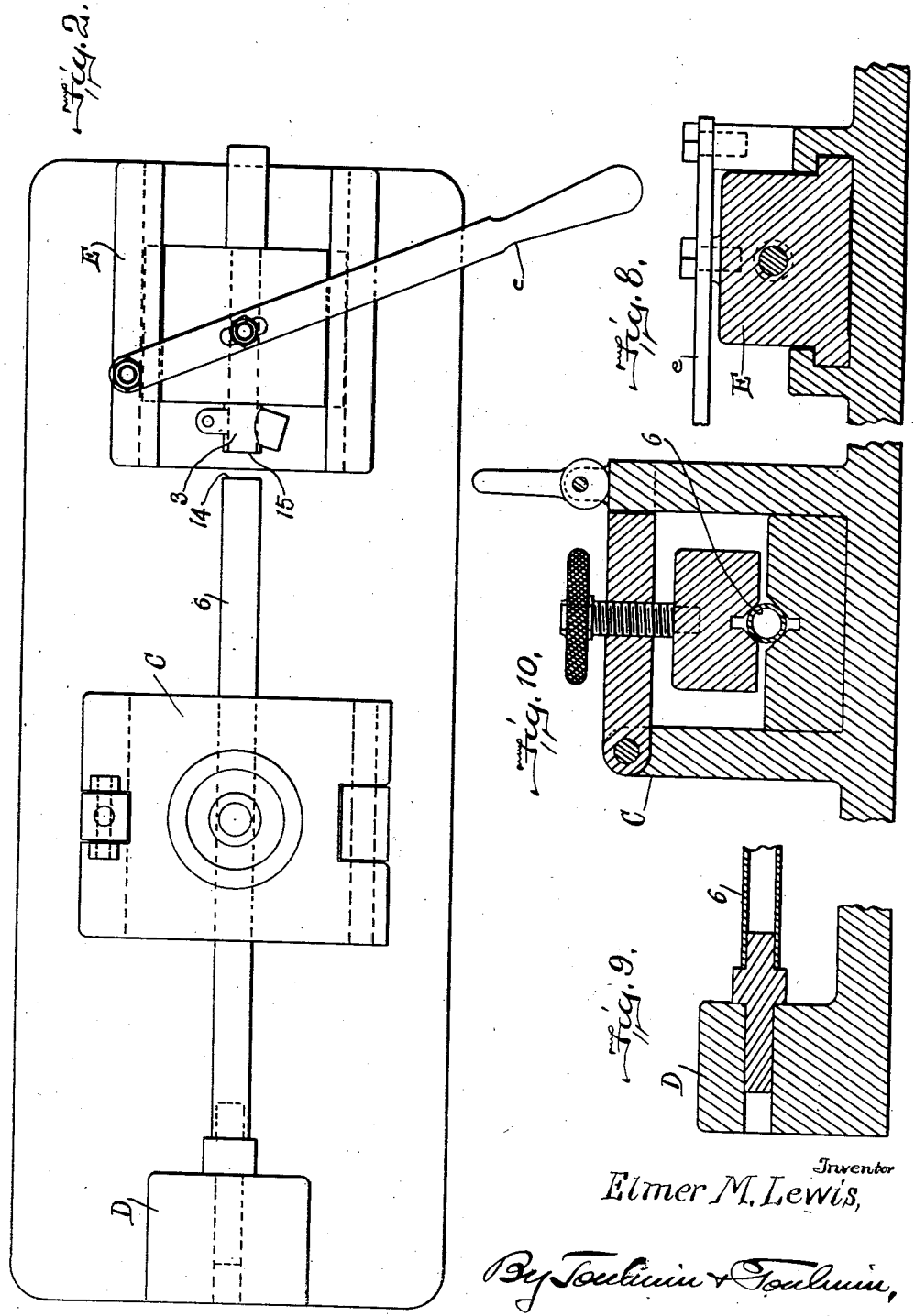

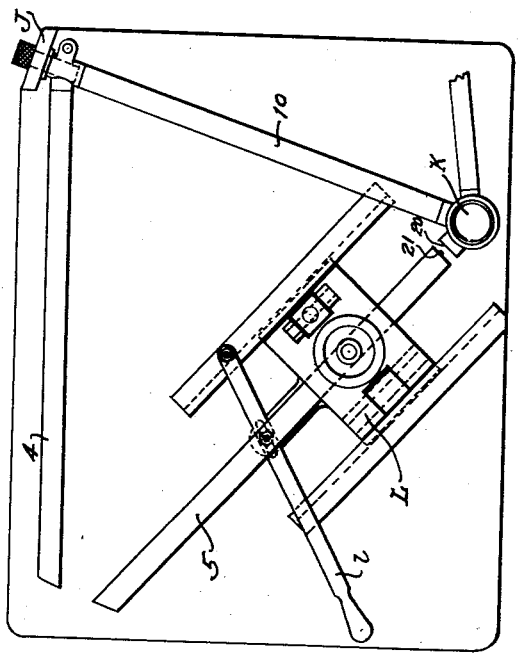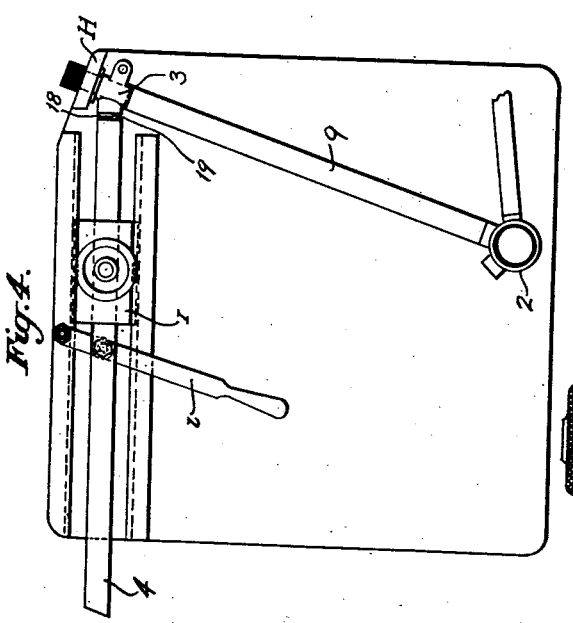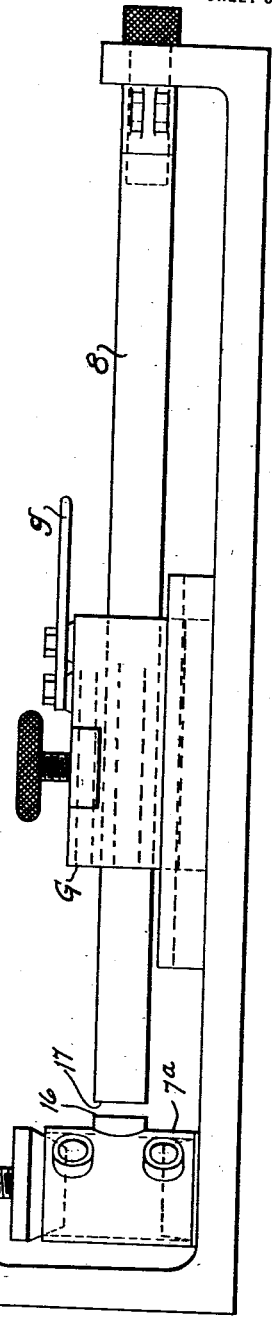

1,403,611.

Patented Jan. 17, 1922.
5 SHEETS—SHEET 4.

INVENTOR.
Elmer M. Lewis,

By Toulmin & Toulmin,

ATTORNEYS

E. M. LEWIS.
PROCESS OF MANUFACTURING BICYCLE FRAMES.
APPLICATION FILED SEPT. 2, 1919.
1,403,611.
Patented Jan. 17, 1922.
5 SHEETS—SHEET 5.
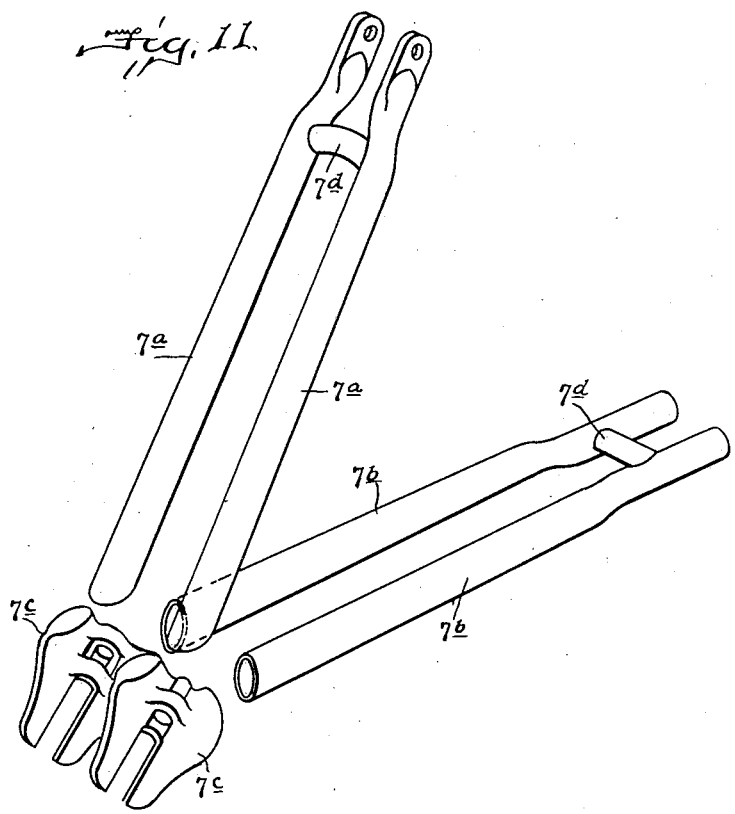
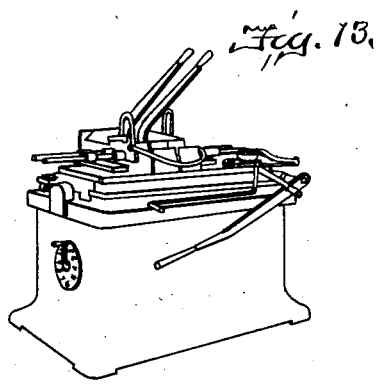
Elmer M. Lewis
INVENTOR.
BY Toulmin & Toulmin,
ATTORNEYS.

UNITED STATES PATENT OFFICE.

ELMER M. LEWIS, OF DAYTON, OHIO, ASSIGNOR TO THE DAVIS SEWING MACHINE COMPANY, OF DAYTON, OHIO, A CORPORATION OF OHIO.

PROCESS OF MANUFACTURING BICYCLE FRAMES.

1,403,611.

Specification of Letters Patent. Patented Jan. 17, 1922.

Application filed September 2, 1919. Serial No. 321,178.

*To all whom it may concern:*

Be it known that I, ELMER M. LEWIS, a citizen of the United States, residing at Dayton, in the county of Montgomery and State of Ohio, have invented certain new and useful Improvements in Processes of Manufacturing Bicycle Frames, of which the following is a specification, reference being had therein to the accompanying drawing.

This invention relates to an improved process of manufacturing bicycles, relating particularly to the manufacture of bicycle frames.

Heretofore it has been common practice in the manufacture of bicycle frames to join the various pieces of the frame together by dip-brazing the joints, reinforcings being used to strengthen certain of the joints and the frame thus formed from the detail parts.

Numerous detail operations are involved in this practice which in their cumulative effect add greatly to the cost of manufacturing and involve variations in construction which make it difficult to maintain uniformity in the finished frames.

It is the main purpose of the present invention to eliminate a number of these detail operations, and to generally simplify and cheapen the construction of the frames and at the same time to produce a more uniform and better constructed frame.

The new process involves novel arrangements and operations employed in butt-welding the frame parts together, as distinguished from the old practice of brazing. The process may be practiced on any suitable welding apparatus equipped with suitable fixtures for supporting and alining the parts to be welded relative to each other, there being a wide range of modification in the type or form of fixtures as well as in the type of welding apparatus that may be used in practicing the process.

In the accompanying drawings a general type of well known welding apparatus is shown; also a complement of supporting and alining fixtures of a preferred form for supporting the work on the machine.

In the drawings,—

Fig. 1 is a plan view of the work and supporting fixture as used in the first step of my process;

Fig. 2 is a plan view of the work supporting fixture as used in the second step of the process;

Fig. 3 is a side elevation of the work and supporting fixture as used in the third step of the process;

Fig. 4 is a plan view of the work and holding fixture as used in the fourth step of the process;

Fig. 5 is a plan view of the work and supporting fixture as used in the fifth step of the process;

Fig. 7 is a side elevation of the parts shown in Fig. 1;

Figs. 8, 9 and 10 are detail views of the parts shown in Fig. 2;

Fig. 11 is a detail view of the parts comprised in the sub-assembly comprising the upper and lower rear forks;

Fig. 13 is a perspective view of a general type of apparatus upon which the new process of manufacturing may be practiced.

Preceding the butt-welding operations which result in first forming the frame parts into sub-assembly units and then the sub-assembly units into the complete frame, the several parts are prepared for the welding operations by providing each part to be welded with a suitable contact surface which conforms to and is substantially equal in surface or face exposure to the corresponding contact surface of the opposite part, thus accomplishing equal fusing of the parts and an effective welding of the joints.

Figure 6:
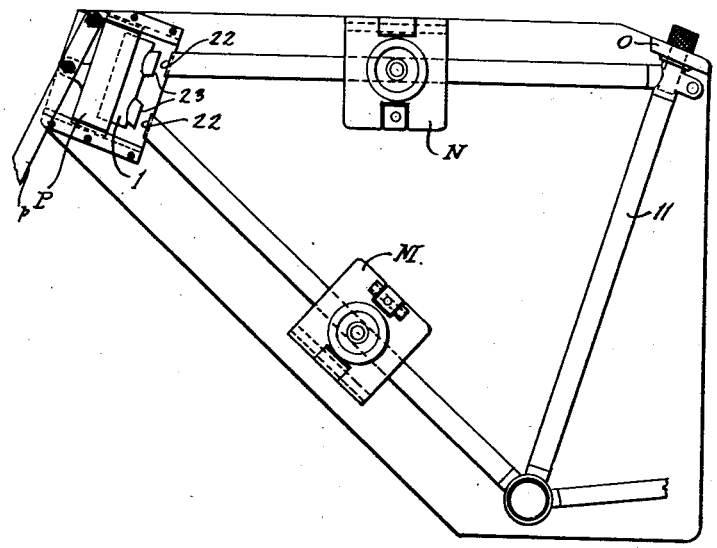
Fig. 6 is a plan view of the work and supporting fixture as used in the sixth and final step of the process.
Figure 12:
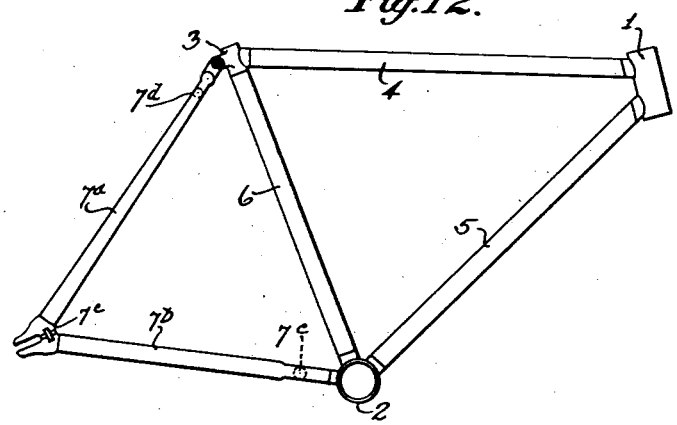
Fig. 12 is a side elevation of the completed frame.

As here shown in the different figures of the drawings the separate parts of the bicycle frame, before the same are constructed into an integral frame, consist of the frame head 1, hangar 2, seat cluster 3, upper frame tube 4, lower frame tube 5, mast tube 6; also the frame sub-assemblies consisting of the upper and lower rear forks, the upper forks being broken away in Figs. 1 and 7, the hangar and rear forks 7ª and the mast and seat post cluster 8, as shown in Fig. 3, the hangar, rear forks, mast and seat post cluster 9, as shown in Fig. 4; the hangar, rear forks, upper tube, mast and seat post cluster 10, as shown in Fig. 5; and the hangar, rear forks, upper and lower tubes, mast and seat post cluster 11, as shown in Fig. 6.

The first step of the butt-welding process consists, as shown in Fig. 1, in supporting the hangar 2 in a supporting and alining fixture A which may be of any suitable construction adapted to properly support the work and to arrange surfaces 12—12 in contact alinement with the contact surfaces 13—13 of the rear forks 7.

The sub-assembly of the rear forks may be accomplished in any suitable manner. The forks as a sub-assembly unit, as shown in Fig. 1, are supported on the welding apparatus and alined relative to the hangar 2 by a suitable fixture B which is adapted to be actuated by a hand lever $b$ to move the rear forks longitudinally to cause contact between the surfaces 12—12 and 13—13 and thus to effect the butt-welding operation which forms the sub-assembly $7^a$, the electrical current to cause fusing of the metal being conducted through the parts in the manner usual to welding operations.

The second step of the process consists in supporting the mast 6 in suitable alining fixtures C and D, a detail of the fixtures being shown in Figs. 9 and 10, respectively, whereby the part 6 is held stationary on the apparatus and the surface 14 of the end of the tube is brought into contact alinement with the corresponding opposite contact surface 15 of the seat cluster 3. The seat cluster is supported and alined in an operable fixture E, a detail of the fixture being shown in Fig. 8, supported upon the work table of the welding apparatus in any suitable manner and adapted to be actuated by a hand lever $e$ to move the part 3 to cause contact of the surfaces 14 and 15 and thus effect the welding operation which forms the sub-assembly 8.

The third step in the process consists in butt-welding the sub-assembly units $7^a$ and 8 together, as shown in Fig. 3, the part $7^a$ being supported in a stationary fixture F and having its contact surface 16 brought into alinement with the corresponding contact surface 17 of the part 8. The part 8 is supported and alined relative to the parts $7^a$ in an operable fixture G actuated by a hand lever $g$ to cause contact of the surfaces 16—17, thereby effecting welding of the parts to form sub-assembly 9.

The fourth step of the process consists in welding the upper frame tube 4 to the sub-assembly 9; the parts 9 being suitably supported in a stationary fixture H to present the contact surface 18 in alinement with the surface 19 of the part 4. The part 4 is supported and alined in an operable fixture I which is actuated by a lever $i$ to effect welding of the parts forming the sub-assembly 10.

The fifth step of the process consists in welding the lower frame tube 5 to the sub-assembly 10. To this end the frame unit 10 may be held in fixed relation to the welding apparatus by any suitable locating and alining fixtures which may consist, as here shown, of the fixtures J and K which serve to aline the frame to bring the contact surface 20 in alinement with the opposite contact surface 21 of the tube 5 to effect the welding operation. The tube 5 is supported and alined by an operable fixture L actuated by a lever $l$ to bring the surfaces 20 and 21 into contact to cause fusing and welding of the metal and thus forming sub-assembly 11.

The sixth and final step of the practice of the process consists in welding the head 1 to the sub-assembly 11. In this operation the frame 11 may be supported and alined in suitable stationary fixtures such as the fixtures M—N—O and the head 1 in an operable fixture P, the opposite contact surfaces 22—22 and 23—23 being thus brought into alinement, and with the operation of the lever $p$ the parts will be caused to contact and fuse to effect the welding, thus completing the frame as shown in Fig. 11.

With respect to the last step of the process as above described it will be understood, as herein stated, that other approved forms of construction may be employed for securing the frame head to the upper and lower frame tubes and thus to form a sub-assembly of the parts preceding the process of butt-welding the several parts and sub-assembly units into the complete frame.

Also with respect to the sub-assembly of the upper and lower rear forks, it will be understood, of course, that the several parts, consisting of the upper and lower fork tubes $7^a$—$7^a$ and $7^b$—$7^b$, respectively, and the right and left fork ends $7^c$—$7^c$, respectively, may also be butt-welded together to form the sub-assembly, an arrangement of the detail parts preceding the welding operation being shown in Fig. 11. The upper and lower fork braces $7^d$—$7^d$ are preferably brazed between the respective tubes.

The supporting and alining fixtures as herein shown are merely of conventional form, shown for illustration purposes. As herein stated any suitable fixtures may be used for supporting and alining the work on the welding apparatus, and it is obvious, of course, that the fixtures may be arranged at any suitable angle to the work-supporting table of the welding apparatus to adapt the work to the best advantage to the successive steps of the process.

It will be further understood that various modifications in the practice of the process and of the instrumentalities employed in connection therewith may be made by those skilled in this art without departing from the principle and purposes of the invention.

I desire, therefore, to claim the invention in broad comprehensive terms as defined in the appended claims.

Having thus fully described my invention, what I claim as new and desire to secure by Letters Patent, is:—

1. In the manufacture of bicycles, the herein described process consisting in supporting and alining a bicycle frame hangar having a plurality of weld contact surfaces, in supporting and alining relative to said hangar an upper and lower rear frame sub-assembly having a corresponding plurality of weld contact surfaces, in moving one of said parts to cause contacting of said opposite surfaces and in the application of heat to the contacting parts to thereby effect butt-welding of said parts.

2. In the manufacture of bicycles, the herein described process consisting in supporting and alining a bicycle frame mast having a weld contact surface, in supporting and alining relative to said mast a seat post cluster having a corresponding weld contact surface, in moving one of said parts to cause contacting of said opposite surfaces and in the application of heat to the contacting parts to thereby effect butt-welding of said parts.

3. In the manufacture of bicycles, the herein described process consisting in supporting and alining a bicycle frame hangar and rear forks sub-assembly having weld contact surfaces, in supporting and alining relative to said parts a mast and seat post cluster sub-assembly having a corresponding weld contact surface, in moving one of said parts to cause contacting of said opposite surfaces and in the application of heat to the contacting parts to thereby effect butt-welding of said parts.

4. In the manufacture of bicycles, the herein described process consisting in supporting and alining a bicycle frame hangar, rear forks and mast and seat post cluster sub-assembly having a weld contact surface, in supporting and alining relative to said sub-assembly an upper frame tube having a corresponding weld contact surface, in moving one of said parts to cause contacting of said opposite surfaces and in the application of heat to the contacting parts to thereby effect butt-welding of said parts.

5. In the manufacture of bicycles, the herein described process consisting in supporting and alining a bicycle frame hangar, rear forks, mast, seat post cluster and upper frame tube sub-assembly having a weld contact surface, in supporting and alining relative to said sub-assembly a lower frame tube having a corresponding weld contact surface, in moving one of said parts to cause contacting of said opposite surfaces and in the application of heat to the contacting parts to thereby effect butt-welding of said parts.

6. In the manufacture of bicycles, the herein described process consisting in supporting and alining a bicycle frame hangar, rear forks, mast, seat post cluster and upper and lower frame tubes sub-assembly having a plurality of weld contact surfaces, in supporting and alining relative to said sub-assembly a frame head having a corresponding plurality of weld contact surfaces, in moving one of said parts to cause contacting of said opposite surfaces and in the application of heat to the contacting parts to thereby effect butt-welding of said parts to form a complete bicycle frame.

7. In the manufacture of bicycles, the herein described process consisting in providing the separate parts of a bicycle frame with suitable contact surfaces adapted for butt-welding, each contact surface conforming substantially in shape and surface exposure to the corresponding surface with which the weld is to be made, in supporting and alining said parts and in the application of heat to them so as to effect butt-weldings therebetween in successive operations to construct a bicycle frame.

8. In the manufacture of bicycles, the herein described process consisting in supporting and alining successively a plurality of bicycle frame sub-assemblies each having a weld contact surface corresponding substantially in outline and area with the contact surface of the part with which the weld is to be effected, and in the application of heat in performing a succession of butt-welding operations whereby said sub-assemblies are constructed into an integral frame.

In testimony whereof, I affix my signature.

ELMER M. LEWIS.